Patented Mar. 5, 1946

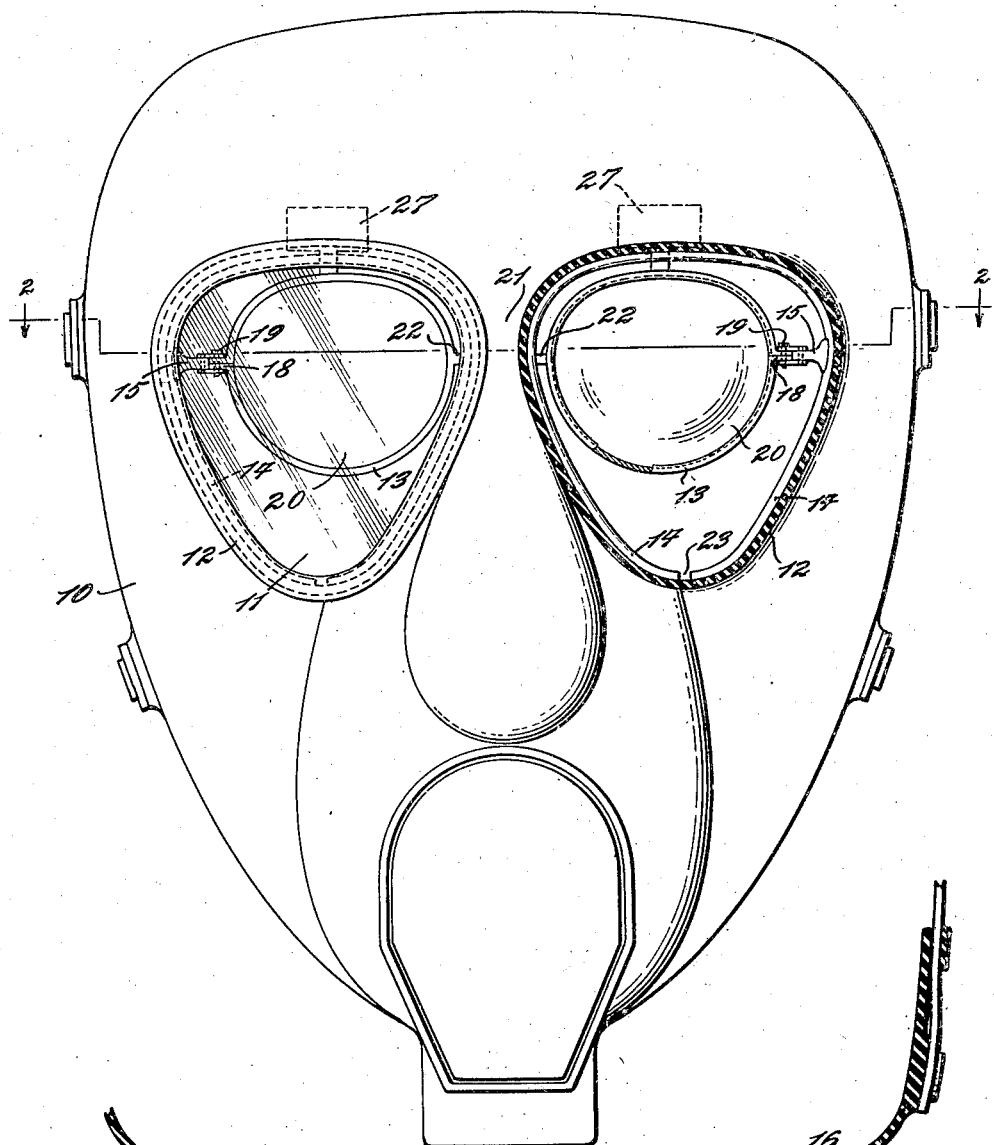
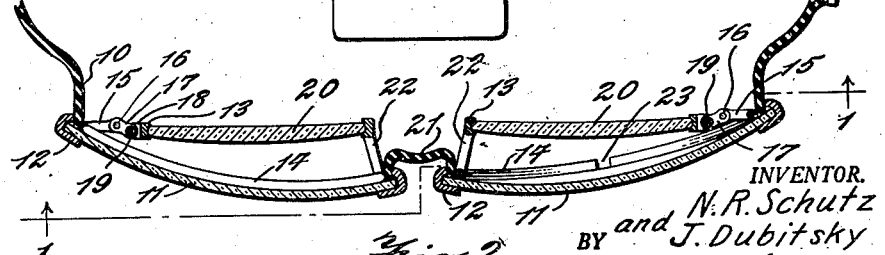

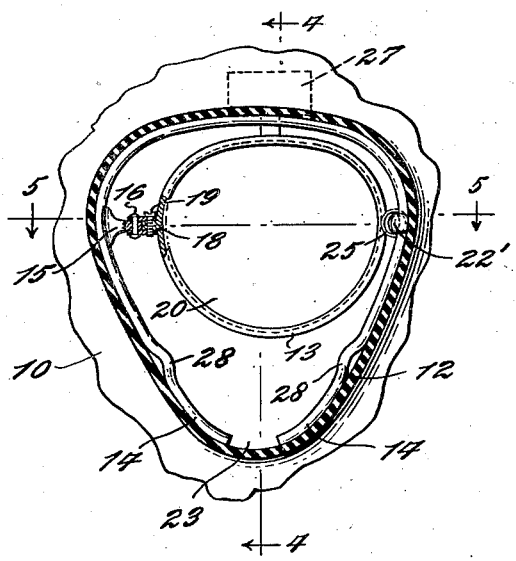
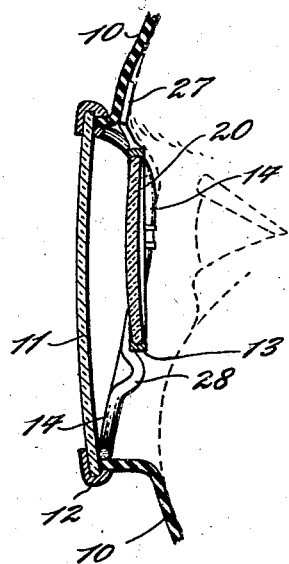
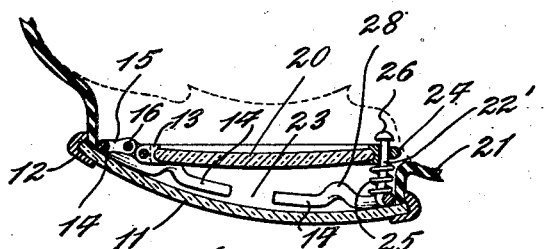

2,396,207

UNITED STATES PATENT OFFICE 2,396,207

LENS MOUNTING FOR GAS MASKS AND THE LIKE

Nathan R. Schutz and Jack Dubitsky, New York, N. Y., assignors of one-third to Alfred H. Sachs, Cleveland, Ohio Application November 9, 1942, Serial No. 465,078

8 Claims. (Cl. 88—41)

The present invention relates to an improved mount or support, in masks of various types, for lenses, and particularly optically ground lenses for persons requiring optical correction.

It is the general object of the invention to provide a lens mount or mounts which can be conveniently applied to various kinds of masks and become a more or less permanent part thereof, whereby the lenses and their frames become an integral part of the mask structure, while yet maintaining the removability and replaceability of the frames and lenses.

While our improved lens mount structure can be incorporated in various kinds of masks, such as welders', miners', firemen's, airmen's, divers', and other masks, it is of particular advantage in gas masks for combat units and the invention will accordingly be further described in detail in connection with a gas mask, such description to be understood as illustrative only, and not as limiting the scope of the invention.

The use of gas masks by soldiers and civilians who must wear glasses has presented a rather serious problem with the equipment that has to date been made available. A separate pair of glasses must be provided for each soldier, which glasses and their frames are constructed to fit within the gas mask; or else, the mask is constructed to fit over the whole head, as well as the face, so as thereby to enclose the glasses normally worn by the soldier. The first type of equipment is objectionable because of the extremely short time available, usually a matter of only about eight seconds, between the gas alarm and the time that the mask must be snugly fitted on the face to protect the wearer both against lachrymator and lung-attacking gases, as well as vesicant gases. The soldier must not only remove the glasses he is wearing, but fit on the special gas mask glasses before he can don his mask. Where the gas mask glasses have been misplaced, or are not readily avaliable, valuable time may be lost, with danger of injury and even death. Also, in the excitement of the moment, there is considerable danger that one of the two pairs of glasses will be damaged. A further objection to this type of equipment is that the temple bars provide points of ingress for gas, since the facial masks cannot ordinarily fit tightly about such bars.

The second type of equipment is objectionable not only because of the large size of a mask required to fit over the whole head, but also because it becomes more difficult to insure adequate sealing against the back of the head and the neck.

It has occurred to us that it is both desirable and possible to provide a lens-mount structure for gas masks, which becomes practically a permanent part of the mask and yet is conveniently removable for adjustment, replacement, or repair. We have accordingly incorporated in a gas mask having any suitable body structure and the usual glass or other transparent lenses or windows seated in suitable fames in the mask, a novel type of support and attachment which is characterized by a number of important features and advantages over prior gas mask equipment. Aside from the fact that the optically ground lenses become a more or less fixed part of the mask, so that the soldier has but to remove his ordinary glasses and don his mask to meet any emergency, our improved lens mount provides a greater range of vision than was possible with the gas mask spectacles heretofore manufactured; and in a preferred embodiment of our invention, the lens frames are made adjustable to accommodate themselves to different facial widths. Thus, whereas the spectacles provided by the United States Army for use with gas masks have a diameter of only 35 mm., which cuts the field of vision by about 50%, and thus consequently greatly handicaps the soldier, the lenses used with our improved mounts can be of the usual size. Also, even where only one type of lens mount is manufactured in accordance with the present invention, the same can be made to fit soldiers having narrow or wide faces by reason of the provision of an adjustment which is described more fully hereinbelow.

In the construction of the present invention, temple bars are completely eliminated with consequent elimination of danger of seepage of gas into the interior of the mask at the temples.

In addition to the adjustability of the lens frame with reference to the eye, we provide stop means in the form of a frontal plate which engages the forehead in the region of the eyebrows to assist in properly locating the lens with reference to the eye, especially for wearers having relatively broad faces. Other stop means are provided to limit the inward movement or adjustment of the lenses for wearers having narrow faces.

An important feature of the present invention resides in a mount frame of simple construction by means of which the lens frame is securely positioned within the mask. The mounting frame is preferably composed of a spring wire which can be contracted to fit it within the window frame and directly against the inside surface of the window, the frame, upon release, springing against the sides of the window frame and entering any groove or recess that may be present thereat, or forming a seat within the relatively soft covering of the window frame or in the body material of the mask at the frame. The mounting frame is provided with slightly raised portions to facilitate gripping of the same with the fingers for insertion or removal. The tension of the frame is sufficient to hold the same and the lens frame secured thereto firmly in the mask. The parts are so positioned and constructed that they do not strike each other when the mask is collapsed, when not in use, the lenses being at the same time protected by the mask.

Other features and advantages of the invention will appear from the following more detailed description and the features of novelty will be set forth in the appended claims.

The accompanying drawings illustrate two forms of the invention. In said drawings, Fig. 1 is a front elevation of the mask partly in section, along the line 1—1 of Fig. 2;

Fig. 2 represents a horizontal cross-section taken through the line 2—2 of Fig. 1;

Figs. 3, 4 and 5 show a modified construction, Fig. 3 being a front view partly in section of the ground lens and its mount, while Figs. 4 and 5 illustrate sections taken along the lines 4—4 and 5—5, respectively, of Fig. 3.

Referring to Figs. 1 and 2, the mask is of any known form, the one illustrated being shown purely by way of example. The mask includes the lenses or windows 11 made of any suitable transparent material such as glass, the windows being mounted within frames 12 which may be of metal, rubber, rubber-coated metal, or any other sufficiently rigid material. As the other parts of the mask itself are more or less of standard or known construction, they need not be further described.

In the form of the invention illustrated, the lens mount is composed of two main elements, namely, the lens frame 13 and the mounting frame 14. As can best be seen from Fig. 2, the mounting frame is provided in the case of each lens mount with an inwardly extending arm 15 which is rigidly secured as by welding, soldering or otherwise, to the frame 14, and is apertured at its free end to receive a pivot pin 16. A pair of clamping plates 17 are secured at one end to the pin 16, one at each side of the arm 15 and receive between them the end flanges 18 of the lens frame which is split at such point. The flanges 18 fit between the clamping plates 17, and the temple end of the lens frame is thus secured to the arm 15 by way of a screw 19. It will be evident that upon removal of the screw 19, the lens frame can be opened for replacement of the lens, indicated at 20, such lens fitting within a suitable groove in the lens frame.

The nose bridge portion of the mask is indicated at 21 and at such bridge end, each of the lens frames is secured to the mounting frame by way of an arm or bar 22 which is welded, soldered, or otherwise secured to the two frames.

The mounting frame 14 is preferably made of resilient or spring wire, its ends being normally spaced apart, as indicated at 23. By compressing the frame near its free ends, the whole assembly can be slipped into position within the inside of the mask and directly behind the window 11, release of the frame causing the same to expand and resiliently engage the inside portions of the mask about the window. Where the inside frame about the window is provided with a flange, or is recessed, the wire frame 14 will spring under the flange or into the recess and thus securely hold the lens frame 13 and its lens in proper position. Even where such flange or recess is not present, the resilience of the wire frame 14 will cause it to press into the relatively soft rubber or similar facing of the window frame, whereby the mounting frame will be securely anchored within the mask. To remove the mounting and its associated lens frame from the mask, it is necessary only to engage the free ends of the wire frame 14 and press them toward each other, whereupon the lens mount can be removed as a unit from the mask. A suitable tool may be employed to engage the wire frame and separate it from the window frame.

It will be seen from the foregoing that we have provided separate and independent mounts for the two lenses which can be easily incorporated in a mask of any ordinary construction and is easily removed therefrom for replacement or repair. The lenses are so positioned within the mask that collapse of the mask when not in use will cause no injury to the lenses, the arms 22 being separated by the resilient bridge piece 21 and the arms being spaced at sufficient distance apart to prevent their striking together upon collapse of the mask. This result may be aided by inclining the arms 22 in opposite directions, as shown in Fig. 2. It will be seen that the lens mount holds the lens in proper optical position, and that the lenses are of normal size and give a normal range of vision to the wearer. If desired, the arms 22 can be made relatively flexible so that a certain degree of adjustment of the lenses 20 can be secured by bending or distorting them, and also by pivoting of the lens frames 13 upon the pivots 16, to compensate for different angularities of the mask when worn by persons of different facial widths.

In the structure shown in Figs. 3, 4 and 5, parts similar to those in Figs. 1 and 2 are similarly numbered. In this form of the invention, special means are provided for insuring proper adjustment of the optically ground lens for persons of different facial widths with whom the angularity of the face portion of the mask will necessarily differ. The temple end or side of the lens frame 13 is free to pivot about an approximately vertical axis on the pin 16; while the bridge end of the frame is given a floating support, so that the lens frame can adjust itself with reference to the eye of the wearer so as to assume the proper optical position. To this end, the arm 22 of Fig. 2 is replaced by a headed rod or bar 22' which is embraced by a loop member 24 rigidly secured to the lens frame 13. A spring 25 is positioned about the rod 22 and urges the lens frame against the head 26 of the rod which acts as a stop. The bar is curved along an arc having the pivot 16 as a center, so as to avoid binding.

The effective length of the bar 22' is about 15 mm., which is sufficient to provide for normal differences of facial contour. When the mask is worn by a person having a relatively narrow face, so that the face portion of the mask will be shaped along a sharper angle or curve, the floating end of the lens will move to its extreme limit of motion against the head of the bar under the action of the spring and thereby compensate wholly or at least in large part for the shifting of the temple end of the lens. Thereby, the lens is brought into correct optical position with reference to the eye. When, on the other hand, the mask is worn by a person with a relatively wide face, so that the front portion of the mask is relatively flat, the floating end of the lens will require adjustment toward the base end of the bar 22', and to accomplish this, we secure, in any suitable manner, to the upper edge of each of the lens frames 13, a frontal plate 27, which is positioned to engage the eyebrow region of the wearer and thereby limit the inward movement of the bridge end of the lens frame.

In this way, the same mask and a standard form of lens mount can be made to fit all wearers, so that the necessity for different sizes, shapes, etc., of parts, is avoided.

To facilitate the operation of the spring wire frame 14 in the manner hereinabove described, we provide the same with upward bends 28 upon opposite sides thereof, so as to provide finger pieces which can be readily engaged even when the mounting frame is in position inside the mask. As in the construction shown in Figs. 1 and 2, the parts are so dimensioned and disposed that the two lens mounts do not strike each other when the mask is collapsed or folded over when not in use. We have found that very satisfactory control between frontal plates 27 is effected if the same are disposed about 2 mm. inwardly of the lens frames to which they are attached. The frontal plates are in general so disposed that when the loop 24 engages the head or stop 26, that is, when the mask is being worn by a person having a rather narrow face, such plates just touch or nearly touch the forehead of the wearer. For greater strength, the bar 22' can be made elliptical in cross-section, and as shown in Fig. 3, the base of the arm 15 at the temple can be extended inward to provide a stronger connection with the mounting frame.

The distance between the top of the lens frame and the mounting frame is about 5 mm., such distance being sufficient for supporting the lens in proper position.

While we have described the lens 20 as being a ground lens for providing optical correction, it is obvious that such lens can be made of plain glass for additional protection to workmen, where the lens mount is employed in an industrial mask to protect workmen against flying chips and the like.

We claim:

1. A mask comprising a body portion having a pair of transparent windows and frames within which the windows are seated, a pair of lens frames separate from each other and adapted to receive optically ground lenses to suit the eyes of the wearer, a mounting member for each lens frame comprising a resilient wire structure adapted upon compression to be fitted within a window frame on the inside of the mask and to be held snugly therein upon release, an arm extending from the mounting member at the temple side thereof, the lens frame being pivoted upon such arm about an approximately vertical axis, a second arm projecting inwardly from the mounting member at the bridge side thereof and provided with a stop at its free end, the lens frame having a portion embracing the second arm, and a spring urging the lens frame inwardly, toward the stop.

2. A mask as defined in claim 1, including a frontal plate adapted to engage the eyebrow region of the wearer to hold the lens frame in proper position within the limit determined by said stop.

3. A mask as defined in claim 1, wherein the lens frame is separable at the temple side and is provided with horizontally extending flanges by which it is pivoted to the first-mentioned arm, and means for detachably securing the flanges to said arm.

4. A pliable mask having a pair of windows and frames therefor, a mounting member for a ground lens in the form of a resilient wire which is adapted to be compressed and inserted within a window frame of the mask at the inside thereof, the member then expanding and frictionally engaging the inside of said frame a lens frame pivotally secured to the mounting member at the temple side thereof, the other side of the lens frame being free to swing in an approximately horizontal direction, and means for supporting said other side of the lens frame upon the mounting member.

5. A pliable mask having a pair of windows and frames within which the windows are seated, said mount comprising a mounting member adapted to be seated inside the mask at the window frames, and means associated with the mounting member for directly supporting a lens, said means including a lens frame, a connection between the temple sides of the mounting member and lens frame, and a second connection of variable length spaced from the first connection and likewise joining the mounting member and lens frame, said length being variable to adjust the angularity of the lens frame.

6. A lens mount as defined in claim 5, wherein the mounting frame is composed of spring wire, whose ends are separated to permit compression of the frame to facilitate insertion within the window frame upon the inside of the latter.

7. A mask comprising a body portion having a pair of transparent windows and frames within which the windows are seated, said mask being of the type which fits closely about the face of the wearer and assumes the general contour of the face, a pair of separate lens frames detachably secured to the inside of the mask behind the windows and adapted to receive a pair of lenses and support the same between the windows and the eyes of the wearer, and means for adjusting each of the lens frames and the lens carried thereby with reference to the eyes of the wearer, the means for securing the lens inside the mask comprising a resilient wire mounting member disposed generally in a plane outside that of the lens frame to provide clearance for gripping said member and adapted upon contraction to be inserted within the window frame and upon release to spring against the inner walls of said frame.

8. A mask comprising a body portion having a pair of transparent windows and frames within which the windows are seated, said mask being of the type which fits closely about the face of the wearer and assumes the general contour of the face, a pair of separate lens frames detachably secured to the inside of the mask behind the windows and adapted to receive a pair of lenses and support the same between the windows and the eyes of the wearer, each lens frame being pivoted upon the mask at the temple side thereof, and means permitting limited swinging movement of each lens frame at the bridge side thereof to enable the lenses to adjust themselves to the eyes of the wearer at different angularities of the face portion of the mask when worn by persons of different facial widths.

NATHAN R. SCHUTZ.
JACK DUBITSKY.